(12) United States Patent
Amacker et al.

(10) Patent No.: US 11,472,500 B2
(45) Date of Patent: Oct. 18, 2022

(54) MOBILE PLATFORM WITH RETRACTABLE DRIVE WHEELS AND STEERABLE WHEELS

(71) Applicant: Toyota Research Institute, Inc., Los Altos, CA (US)

(72) Inventors: Matthew Amacker, Santa Clara, CA (US); Joseph Taylor, San Jose, CA (US); Gregory J. Klein, San Mateo, CA (US); Jonathan Yao, San Jose, CA (US); Andrew Custer, Oakland, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 788 days.

(21) Appl. No.: 16/419,732

(22) Filed: May 22, 2019

(65) Prior Publication Data

US 2020/0370998 A1    Nov. 26, 2020

(51) Int. Cl.
*B62D 61/12*     (2006.01)
*G01M 17/007*    (2006.01)
*G05D 1/02*      (2020.01)
*B60G 17/00*     (2006.01)
*B62D 15/00*     (2006.01)
*B60G 17/02*     (2006.01)

(52) U.S. Cl.
CPC ............. *B62D 61/12* (2013.01); *B60G 17/00* (2013.01); *B62D 15/00* (2013.01); *G01M 17/0078* (2013.01); *G05D 1/0214* (2013.01); *B60G 17/021* (2013.01); *B60G 2500/30* (2013.01)

(58) Field of Classification Search
CPC .. B60G 17/00; B60G 17/021; B60G 2500/30; B62D 15/00; B62D 61/12
See application file for complete search history.

(56) References Cited

U.S. PATENT DOCUMENTS 2,452,110 A * 10/1948 Dourte .................... B60B 11/10
                                                  280/304
2,699,222 A *  1/1955 Van Doorne .......... B60K 17/36
                                                 180/24.11
3,232,633 A *  2/1966 Feher .................... B62D 37/00
                                                  280/43.23
3,618,966 A * 11/1971 Vandervest ............. B60B 33/06
                                                  280/43.24

(Continued)

FOREIGN PATENT DOCUMENTS

GB          2206662 A      1/1989

*Primary Examiner* — Frank B Vanaman
(74) *Attorney, Agent, or Firm* — Christopher G. Darrow; Darrow Mustafa PC

(57) ABSTRACT

A mobile platform includes a base having a first surface and at least one drive wheel coupled to the base so as to movable with respect to the base first surface. A drive wheel retention mechanism is coupled to the at least one drive wheel and is structured to retain the at least one drive wheel in a first position in which the at least one drive wheel extends to a first distance from the first surface along a first side of the first surface. A plurality of roller elements is also coupled to the base and is structured to extend to a distance from the first surface along the first side of the first surface. The distance of the plurality of roller elements from the first surface is less than the first distance of the at least one drive wheel from the first surface.

14 Claims, 6 Drawing Sheets

(56) References Cited

U.S. PATENT DOCUMENTS

| | | | | |
|---|---|---|---|---|
| 3,763,945 A | * | 10/1973 | Danielson | B62D 11/08 |
| | | | | 180/6.66 |
| 3,871,129 A | | 3/1975 | Tong | |
| 4,856,814 A | * | 8/1989 | Jones | B62D 61/10 |
| | | | | 180/209 |
| 5,535,843 A | * | 7/1996 | Takeda | B25J 5/007 |
| | | | | 180/200 |
| 6,641,893 B1 | | 11/2003 | Suresh et al. | |
| 6,883,641 B2 | * | 4/2005 | Julien | B66F 11/042 |
| | | | | 182/69.5 |
| 2002/0124764 A1 | * | 9/2002 | Coveyou | B62D 61/12 |
| | | | | 180/6.2 |
| 2006/0113743 A1 | * | 6/2006 | Bryant | B60G 17/021 |
| | | | | 280/124.179 |
| 2008/0314656 A1 | * | 12/2008 | Brehob | B60G 17/0152 |
| | | | | 180/7.1 |
| 2013/0018526 A1 | | 1/2013 | Kelly et al. | |

* cited by examiner

MOBILE PLATFORM WITH RETRACTABLE DRIVE WHEELS AND STEERABLE WHEELS

TECHNICAL FIELD

The subject matter described herein relates to systems and methods, including guided mobile platforms and guided soft targets, for testing crash avoidance technologies.

BACKGROUND

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. A mobile platform may be utilized for testing vehicle technologies incorporated into a conventional passenger vehicle. The mobile platform may be structured to simulate aspects of a conventional vehicle so that a conventional passenger vehicle (or subject vehicle) may contact the mobile platform in a collision scenario. The mobile platform may be designed so that the subject vehicle may collide with the mobile platform without damage to either the test platform or the subject vehicle. This enables the testing of various technologies incorporated into the subject vehicle with minimal vehicle damage and no injury to personnel.

SUMMARY OF THE INVENTION

In one aspect of the embodiments described herein, a mobile platform is provided. The mobile platform includes a base having a first surface and at least one drive wheel coupled to the base so as to movable with respect to the base first surface. A drive wheel retention mechanism is coupled to the at least one drive wheel. The drive wheel retention mechanism is structured to retain the at least one drive wheel in a first position of the at least one drive wheel in which the at least one drive wheel extends to a first distance of the at least one drive wheel from the first surface along a first side of the first surface. A plurality of roller elements is also coupled to the base. Each roller element is structured to extend to a distance of the plurality of roller elements from the first surface along the first side of the first surface. The distance of the plurality of roller elements from the first surface is less than the first distance of the at least one drive wheel from the first surface.

In another aspect of the embodiments described herein, a mobile platform is provided. The mobile platform includes a base having a first surface, and at least one drive wheel coupled to the base so as to movable with respect to the base first surface. A drive wheel retention mechanism is coupled to the at least one drive wheel and is structured to retain the at least one drive wheel in a first position of the at least one drive wheel in which the at least one drive wheel is structured to be in contact with a ground surface. A plurality of roller elements is coupled to the base and structured to be spaced apart from the ground surface when the at least one drive wheel is in contact with the ground surface.

In yet another aspect of the embodiments described herein, a mobile platform is provided. The mobile platform includes a base, and at least one drive wheel coupled to the base so as to movable with respect to the base. A drive wheel retention mechanism is coupled to the at least one drive wheel and to the base. The drive wheel retention mechanism is structured to retain the at least one drive wheel in a first position of the at least one drive wheel in which the at least one drive wheel is in contact with a ground surface. The drive wheel retention mechanism is deactivable to enable movement of the at least one drive wheel from the first position of the at least one drive wheel. One or more sensors are provided including sensors configured to detect position and motion parameters of a subject vehicle in an external environment of the mobile platform and sensors configured to detect position and motion parameters of the mobile platform. One or more processors are communicably coupled to the one or more sensors. A memory is communicably coupled to the one or more processors and stores an autonomous control module including instructions that when executed by the one or more processors cause the one or more processors to deactivate the drive wheel retention mechanism to enable movement of the at least one drive wheel responsive to a determination that a collision condition has occurred.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1:
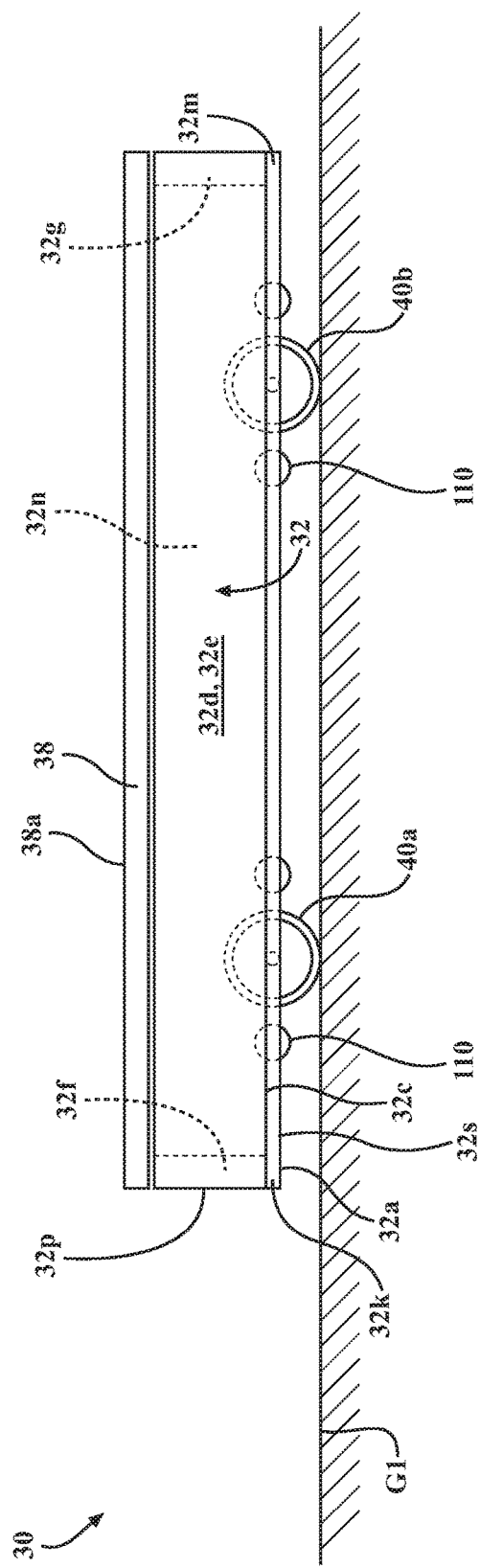
FIG. 1 is a schematic side view of a mobile platform including repositionable drive wheels and steerable wheels in accordance with an embodiment described herein.

In one or more arrangements described herein, a mobile platform includes a base. The mobile platform may be autonomously operated. The mobile platform may include one or more drive wheels coupled to the base so as to movable with respect to the base, and one or more steerable wheels coupled to the base so as to movable with respect to the base. A drive wheel retention mechanism retains the drive wheel(s) in first positions in which the drive wheels are in contact with a ground surface. The drive wheel retention mechanism is deactivable to enable retraction of the drive wheel(s) by a drive wheel repositioning mechanism, to positions spaced apart from the ground surface. A steerable wheel retention mechanism retains the steerable wheel(s) in first positions in which the drive wheels are in contact with the ground surface. The steerable wheel retention mechanism is deactivable to enable retraction of the steerable wheel(s) by a steerable wheel repositioning mechanism, to positions spaced apart from the ground surface. Roller elements are mounted on an underside of the mobile platform to support the mobile platform when the steerable wheels and drive wheels are spaced apart from the ground surface. One or more sensors include sensors configured to detect position and motion parameters of a subject vehicle in an external environment of the mobile platform and sensors configured to detect position and motion parameters of the mobile platform. A control module in communication with the sensors controls operation of the steerable wheel and drive wheel mechanisms to space the steerable wheels and drive wheels apart from the ground surface responsive to a determination that a collision condition of the guided mobile platform has occurred. When the steerable wheels and drive wheels are retracted, the mobile platform is supported by only the roller elements. This enables the mobile platform to readily move in any direction responsive to contact with a subject vehicle, to aid in preventing collision damage to the subject vehicle and the mobile platform.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar reference numerals in different figures refer to elements common to the different figures. Also, numerous specific details are set forth in order to provide a thorough understanding of the embodiments described herein. However, it will be understood by those of ordinary skill in the art that the embodiments described herein can be practiced without these specific details.

FIG. 1 is a schematic side view of a mobile platform 30 in accordance with embodiments described herein. Various elements (such as bumpers, structures simulating a vehicle chassis, etc.)(not shown) may be attached to or added onto the mobile platform 30 to provide a guided test platform 29 (FIG. 2) which may interact with a conventional vehicle (i.e., a "subject vehicle") to test vehicle sensors, warning systems, etc. A "subject vehicle" may be a vehicle undergoing testing which involves operation of the subject vehicle in the environment of the guided test platform 29 and which may involve collision or contact with the guided test platform. The subject vehicle may be a conventional motor vehicle (such as a passenger sedan, for example). The guided test platform 29 may be configured to operate autonomously in the same environment as the subject vehicle, where the platform and the test vehicle may interact.

In embodiments described herein, the mobile platform 30 may include a base 32a. Base 32a may have a first surface 32s which may form a bottom surface of the base 32a. A plurality of roller elements 110 may be mounted along the base so as to extend from the base first surface 32s as shown. Base 32a may also include a second surface 32c opposite the first surface. Second surface 32c may form a floor of the base 32a onto which various elements of the mobile platform may be mounted in an interior cavity 32n of the mobile platform 30 as described herein. Opposed side walls 32d, 32e may extend from corresponding sides of the base 32a to form sides of the mobile platform 30. Walls 32d, 32e may be structured to enable attachment of bumpers thereto, as described herein.

Opposed end walls 32f, 32g may extend respectively from a front end 32k and a rear end 32m of base 32a to form front and rear walls of the mobile platform 30. In combination, walls 32d, 32e, 32f, and 32g may form the interior cavity 32n of the mobile platform 30. Interior cavity 32n may be structured for receiving therein various systems and components dedicated to propelling, stopping, guiding and otherwise operating the mobile platform 30 as the platform moves along a ground surface G1. In one or more arrangements, walls 32d, 32e, 32f, and 32g may be structured to extend vertically from base 32a when the mobile platform 30 is resting on a level ground surface G1.

A cover 38 may be secured to edges of walls 32d, 32e, 32f, and 32g to enclose the interior cavity 32n and to provide a surface 38a along which a structure may be mounted for vehicle testing purposes. Cover 38 is designed to enclose and protect the mobile platform systems and components contained in cavity 32n. Cover 38 may be attached to walls 32d, 32e, 32f, and 32g so as to be supported by the walls, as shown in FIG. 1. When the mobile platform 30 is positioned on a ground or road surface G1, the cover outer surface 38a may form a top surface of the mobile platform 30. For test purposes, a structure (not shown) simulating a vehicle chassis may be mounted onto the top surface 38a of the cover 38 to create a "guided soft target" usable for testing subject vehicle sensors, warning systems, and occupant protection systems. The mobile platform/guided soft target may operate autonomously or under remote control so as to interact with subject vehicles in any of a variety of test scenarios.

The mobile platform 30 may be suspended above the ground surface G1 by a plurality of wheels 40a, 40b. The wheels 40a, 40b may be mounted to the base 32a via wheel mountings located inside the base internal cavity 32n as shown in FIGS. 4-7 and described in greater detail below.

Figure 2:
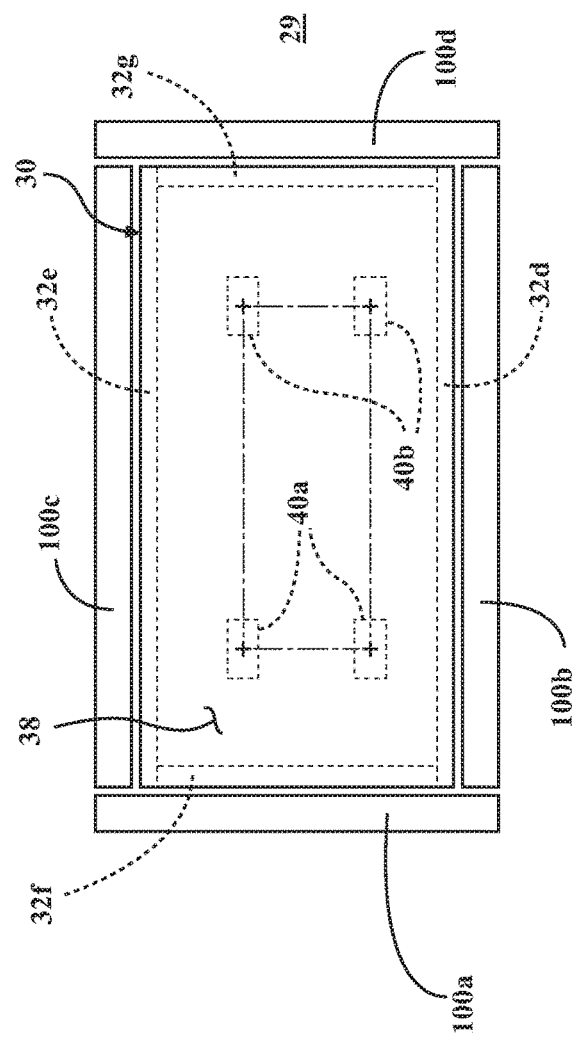
FIG. 2 is a schematic plan view of one embodiment of a guided test platform 29 incorporating the mobile platform 30 of FIG. 1, showing bumpers attached to sides of the mobile platform.

FIG. 2 is a schematic plan view of one embodiment of a guided test platform 29 incorporating the mobile platform 30 of FIG. 1, showing bumpers 100a-100d attached to sides of the mobile platform 30 to cushion the platform in the event of collision with a subject vehicle. FIG. 2 shows bumpers 100a-100d attached to associated walls 32d, 32e, 32f, and 32g of the mobile platform 30. Bumpers 100a-100d may have any structure or structures suitable for cushioning the guided test platform 29 in collisions with subject vehicles.

Figure 3:
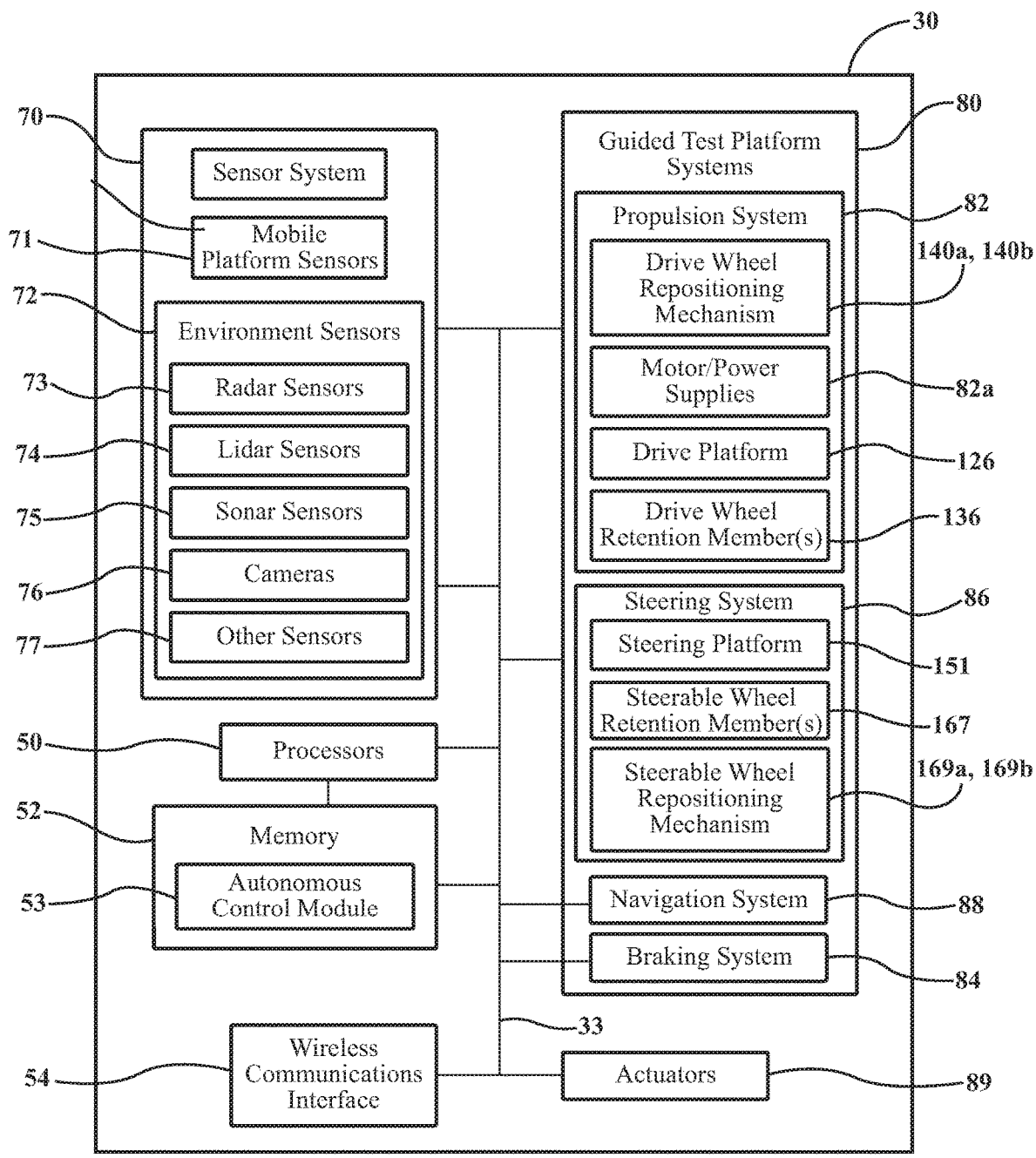
FIG. 3 is a block schematic diagram of the mobile platform of FIGS. 1 and 2 showing elements and systems configured to enable functioning of the platform as described herein.

FIG. 3 is a schematic block diagram showing various elements and systems for controlling operations of the mobile platform 30. The mobile platform 30 can have any combination of the various elements shown in FIG. 3. The mobile platform 30 may have more or fewer elements and/or systems than shown. The platform 30 may also include alternative elements and/or systems to those shown. In some arrangements, the mobile platform 30 may be implemented without one or more of the elements shown in FIG. 3.

The mobile platform 30 can include one or more processors 50. In one or more arrangements, the processor(s) 50 can be a main processor of the mobile platform 30. For instance, the processor(s) 50 can be an electronic control unit (ECU). The processor(s) 50 may be operably connected to other elements of the mobile platform for receiving information from the other elements and for issuing control commands to the other elements, to control or aid in controlling operations of the guided platform. The terms "operably connected" and "operably coupled" as used throughout this description, can include direct or indirect connections, including connections without direct physical contact.

One or more memories 52 may be operably coupled to the processor(s) 50 for storing an autonomous control module 53 (described below), other modules, and any data and other information needed for diagnostics, operation, control, etc. of the mobile platform. The memories 52 may be one or more of a random-access memory (RAM), read-only memory (ROM), a hard-disk drive, a flash memory, or other suitable memory for storing the required modules and information.

Some or all operations of the mobile platform 30 may be autonomously controlled, for example, by one or more autonomous control module(s) 53. As used herein, "autonomous control" refers to controlling various aspects of the movement and/or other operations of the mobile platform 30 with minimal or no input from a human operator. In one or more embodiments, the mobile platform 30 is highly automated or completely automated. Generally, "module", as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium, such as memory 52. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In addition to the autonomous control module 53, one or more other modules (not shown) for other purposes may be incorporated into the mobile platform 30. Any of the modules can be implemented as computer-readable program code that, when executed by processor(s) 50, autonomously implement various mobile platform control functions. Such functions may include control of the various mobile platform systems described herein. One or more of the modules can be a component of the processor(s) 50, or one or more of the modules can be executed on and/or distributed among other processing systems to which the processor(s) 50 is operably connected. The modules can include instructions (e.g., program logic) executable by the one or more processor(s) 50. In one or more arrangements, one or more of the mobile platform modules can include artificial or computational intelligence elements, e.g., neural network, fuzzy logic or other machine learning algorithms. Further, in one or more arrangements, the functions of one or more of the modules can be distributed among a plurality of the modules described herein. In one or more arrangements, two or more of the modules can be combined into a single module.

The autonomous control module 53 and/or processor(s) 50 can be configured to receive data from the sensor system 70 and/or any other type of system or element capable of acquiring information relating to the mobile platform 30 and/or the external environment of the mobile platform 30. In one or more arrangements, the autonomous control module 53 and/or processor(s) 50 can use such data in controlling the mobile platform. The autonomous control module 53 can determine position and velocity of the mobile platform 30. The autonomous control module 53 can be configured to receive and/or determine location information for neighboring vehicles and other environmental features. Information acquired by the autonomous control module 53 may be used to determine the current state of the mobile platform 30 and/or to estimate position and orientation of the mobile platform 30 with respect to its environment. The autonomous control module 53 can control various operations of the mobile platform 30 either alone or in combination with processor(s) 50.

The autonomous control module 53 can be configured to determine travel path(s), current autonomous maneuvers for the mobile platform 30, future autonomous maneuvers and/or modifications to current autonomous maneuvers based on data acquired by the sensor system 70 and/or data from any other suitable source. "Autonomous maneuver" means one or more actions that affect the movement of the mobile platform 30. Examples of autonomous maneuvers include accelerating, decelerating, braking, turning, and/or reversing, just to name a few possibilities. The autonomous control module 53 can be configured to implement determined autonomous maneuvers. The autonomous control module 53 can cause, directly or indirectly, such autonomous maneuvers to be implemented. As used herein, "cause" or "causing" means to make, command, instruct, and/or enable an event or action to occur or at least be in a state where such event or action may occur, either in a direct or indirect manner. The autonomous control module 53 can be configured to execute various vehicle control functions and/or to transmit data to, receive data from, interact with, and/or control the mobile platform 30 and/or one or more systems thereof (e.g., one or more of mobile platform systems 80).

In one or more arrangements, some or all operations of the mobile platform 30 may be controlled remotely, for example, by radio control from a remote station (not shown). To enable wireless control of the platform 30, the platform may be provided with a wireless communications interface 54. In one or more embodiments, the mobile platform 30 is configured with one or more semi-autonomous operational modes in which one or more computing systems perform a portion of the navigation and/or maneuvering of the mobile platform, and a human operator provides inputs to the mobile platform to perform a portion of the navigation and/or maneuvering of the mobile platform 30.

As noted above, the mobile platform 30 can include the sensor system 70. The sensor system 70 can include one or more sensors. "Sensor" means any device, component and/or system that can detect, and/or sense something. The one or more sensors can be configured to detect, and/or sense in real-time. As used herein, the term "real-time" means a level of processing responsiveness that system senses as sufficiently immediate for a particular process or determination to be made, or that enables the processor to keep up with some external process.

In arrangements in which the sensor system 70 includes a plurality of sensors, the sensors can function independently from each other. Alternatively, two or more of the sensors can work in combination with each other. In such a case, the two or more sensors can form a sensor network. The sensor system 70 and/or the one or more sensors can be operably connected to the processor(s) 50, control module 53 and/or another element of the mobile platform 30 (including any of the elements shown in FIG. 3).

The sensor system 70 can include any suitable type of sensor. Various examples of different types of sensors are described herein. However, it will be understood that the embodiments are not limited to the particular sensors described. The example sensors may include one or more environment sensors 72 and/or one or more mobile platform sensors 71. However, it will be understood that the embodiments are not limited to the particular sensors described.

The mobile platform sensor(s) 71 can detect, determine, and/or sense information about the mobile platform 30 itself. In one or more arrangements, the mobile platform sensor(s) 71 can be configured to detect, and/or sense position and orientation changes of the mobile platform 30, such as, for example, based on inertial acceleration. The mobile platform sensor(s) 71 may include one or more sensors configured to detect position and motion parameters of the mobile platform 30. In one or more arrangements, the mobile platform sensor(s) 71 can include one or more accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the mobile platform sensor(s) 71 can include a speedometer to determine a current speed of the mobile platform 30. Mobile platform sensors 71 may include sensors configured to detect conditions indicative of a collision between the mobile platform 30 and a test vehicle.

Environment sensors 72 may be configured to acquire, and/or sense mobile platform environment data. "Mobile platform environment data" includes data and/or information about the external environment in which the mobile platform is located. For example, the one or more environment sensors 72 can be configured to detect, quantify and/or sense vehicles and/or obstacles in at least a portion of the external environment of the mobile platform 30 and/or information/data about such vehicle and/or obstacles. Such obstacles may be stationary objects and/or dynamic objects. Sensor system 70 may include one or more sensors configured to detect position and motion parameters of a subject vehicle in an external environment of the mobile platform 30. Environment sensors 72 may include sensors configured to detect conditions indicative of a pending collision between the mobile platform 30 and a test vehicle.

The one or more environment sensors 72 can be configured to detect, measure, quantify and/or sense other things in the external environment of the mobile platform 30, such as, for example, vehicles, lane markers, signs, traffic lights, traffic signs, lane lines, crosswalks, curbs proximate the mobile platform 30, off-road objects, etc. As an example, in one or more arrangements, the sensor system 70 can include one or more radar sensors 73, one or more LIDAR sensors 74, one or more sonar sensors 75, and/or one or more cameras 76. In addition, other types of sensors 77 may be incorporated into the sensor system 70 for various purposes, depending on the specific test requirements and operational requirements of the mobile platform 30.

The mobile platform 30 can include one or more mobile platform systems 80. Various examples of the one or more mobile platform systems 80 are shown in FIG. 3. However, the mobile platform 30 can include more, fewer, or different guided test platform systems. In addition, the systems shown may contain more, fewer, or different elements than those shown in FIG. 3. It should be appreciated that although particular mobile platform systems are separately defined, each or any of the systems or portions thereof may be otherwise combined or segregated via hardware and/or software within the mobile platform 30. The mobile platform 30 can include a propulsion system 82, a braking system 84, a steering system 86, and/or a navigation system 88. Each of these systems can include one or more devices, components, and/or combination thereof, now known or later developed.

The propulsion system 82 may include any motors, batteries, and/or other power supplies (collectively designated 82a) which may be coupled to the drive wheels 40b via a suitable drive train (not shown). The platform power source 82a may provide power for operating all aspects of the mobile platform 30. The drive train may include chain drives, belt drives, gears, and/or any other suitable mechanisms for transferring motion from platform power sources 82a to the platform drive wheels 40b. Platform throttle or acceleration control elements may be incorporated into the propulsion system. For example, power supplied from platform batteries to a mobile platform drive train may be regulated to control the speeds of the drive wheels. The steering system 86 may include steerable wheels 40a and any system, mechanisms and/or actuators suitable for implementing steering commands from the autonomous control module 53 and/or processor(s) to steer the mobile platform 30. The braking system 84 may include any systems, elements and/or mechanisms suitable for implementing braking commands from the autonomous control module 53 to control braking of any of wheels 40a, 40b. The navigation system 88 can include one or more devices, sensors, applications, and/or combinations thereof, now known or later developed, configured to determine the geographic location of the mobile platform 30 and/or to determine a travel route for the mobile platform 30. The navigation system 88 can include one or more mapping applications to determine a travel route for the mobile platform 30. The navigation system 88 can include a global positioning system, a local positioning system or a geolocation system.

The mobile platform 30 can include one or more actuators 89. The actuators 89 can be any element or combination of elements operable to modify, adjust and/or alter one or more of the mobile platform systems 80 or components thereof to responsive to receiving signals or other inputs from the processor(s) 50 and/or the autonomous control module 53. Any suitable actuator can be used. For instance, the one or more actuators 89 can include motors, pneumatic actuators, hydraulic pistons, relays, solenoids, and/or piezoelectric actuators, just to name a few possibilities.

Figure 4:
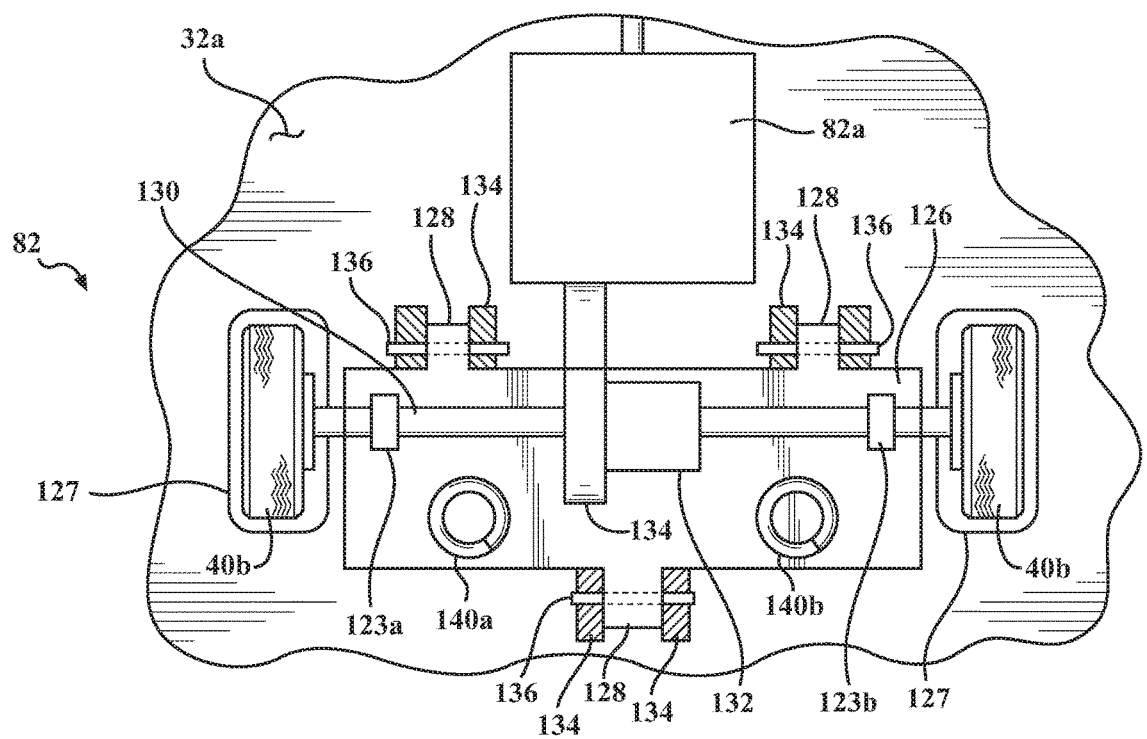
FIG. 4 is a schematic plan cross-sectional view a portion of the mobile platform of FIGS. 1 and 2, showing elements of a steering system of the test platform.

FIG. 4 is a schematic plan cross-sectional view a portion of the mobile platform of FIGS. 1 and 2, showing elements of a propulsion system 82 of the mobile platform 30. Referring to FIGS. 3 and 4, the propulsion system 82 may include any motors, batteries, and/or other power supplies (collectively designated 82a) which may be coupled to the drive wheels 40b via a suitable drive train. In the embodiment shown in FIG. 4, the drive train includes a chain or belt drive 139 operably coupled to platform power source 82a, and a gearbox 132 operable coupled to the chain/belt drive 139.

Figure 6:
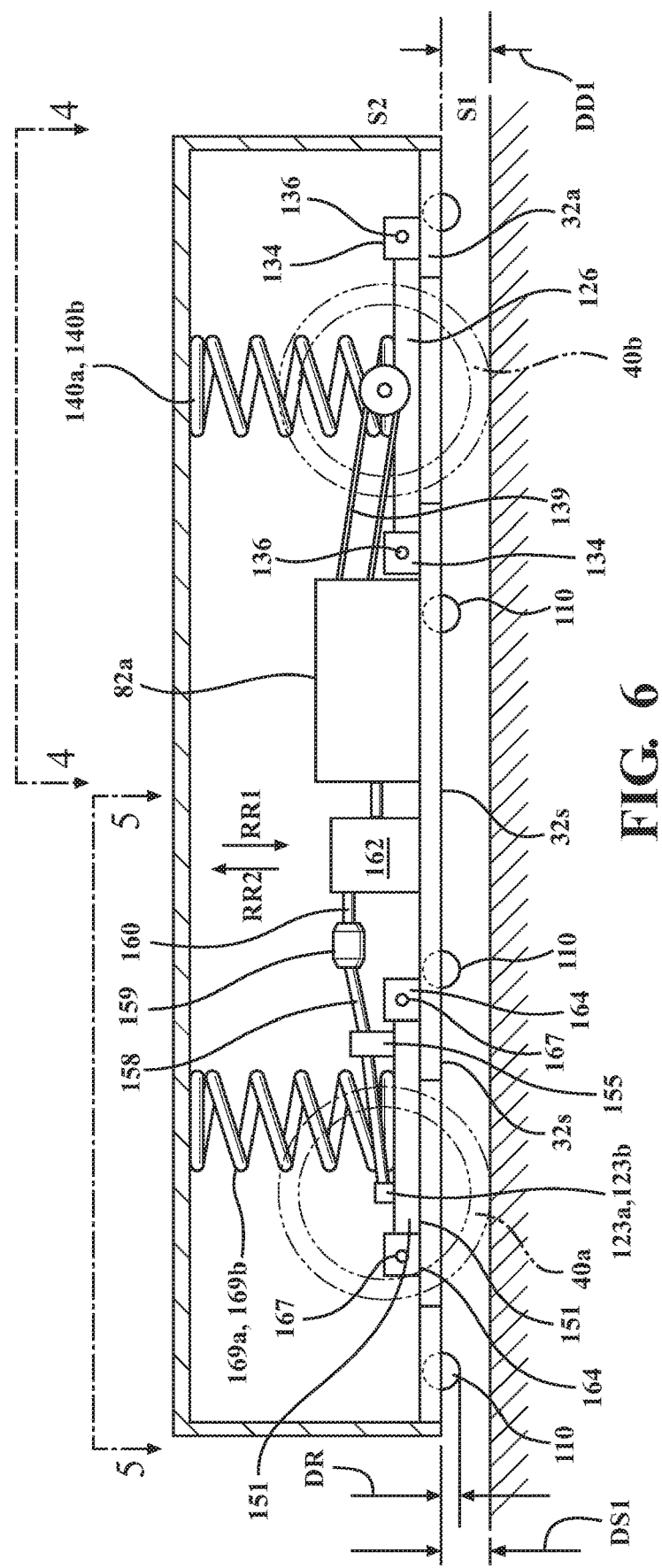
FIG. 6 is a schematic cross-sectional side view of the mobile platform of FIGS. 1 and 2, showing elements of the propulsion system and the steering system in a configuration where the guided platform wheels are in contact with a ground surface.

Referring to FIGS. 4 and 6, the mobile platform propulsion system 82 may include at least one drive wheel 40b coupled to the base 32a so as to be movable with respect to the base first surface 32s. Wheels 40b may be drive wheels operably coupled to (or incorporated into) the propulsion system 82. The propulsion system 82 may be structured to rotate the drive wheels 40b to propel the mobile platform 30 along the ground surface G1. In other arrangements, all of the wheels 40a, 40b may be drive wheels, but some of the wheels may also be steerable wheels structured to be operable to control a direction of movement of the mobile platform 30 as the platform is propelled along the ground surface G1 by the drive wheels. Similarly, although the embodiment shown includes a pair of drive wheels 40b, a single drive wheel or more than two drive wheels may be used, depending on a given design. The wheels 40b may extend to the base exterior through wheel openings 127 formed in the base 32a.

In the embodiment shown, to enable the drive wheels 40b to be movable with respect to base 32a, the wheels 40b are mounted via conventional rotatable wheel mounts 123a, 123b to a drive platform 126 structured to be movable with respect to base 32a. The drive platform 126 may be a plate formed from a steel or another suitable material. The drive platform 126 may have flanges 128 extending from one or more edges thereof. Flanges 128 may have through holes formed therein.

As seen in FIG. 4, a drive shaft 130 may connect the drive wheels 40b. Gearbox 132 may rotatably couple the drive shaft 130 to chain/belt drive 139. The gearbox 132 may be fixedly mounted to the drive platform 126. The chain/belt drive 139 may be coupled to platform power source 82a which is mounted to the base floor 32c. The chain/belt drive 139 may be structured to be operable by the platform power source 82a, to propel the chain/belt drive 139 for rotating the wheels 40b. A portion of the chain/belt drive 139 coupled to the gearbox 132 may be structured to be movable with respect to the portion of the chain/belt drive coupled to the power source 82a, as the drive platform 126 moves with respect to the base 32a. By this transmission system, the drive wheels 40b may be rotated and also repositioned within the mobile platform. Alternative drive motion and transmission systems may also be used.

As seen in FIG. 6, when the drive platform 126 is secured on or near the base floor 32c, the drive wheels 40b are retained in first positions of the drive wheels 40b in which the drive wheels extend through the wheel openings 127 and past the roller elements 110 to make contact with the ground surface G1. Referring to FIGS. 4 and 6, to retain the drive wheels 40b in positions to contact the ground surface G1, drive platform 126 may be secured to the base floor 32c or near the floor by a drive wheel retention mechanism. In one or more arrangements of the drive wheel retention mechanism, base flanges 134 may extend from floor 32c in positions structured to bracket each drive platform flange 128 on opposite sides thereof when the drive platform 126 is positioned on or near the base floor. Each base flange 134 may have a through hole formed therein. The base flange through-holes are structured to be coaxially aligniable with the drive platform flange holes when the drive platform 126 is positioned on or near the floor 32c.

In one or more arrangements, the drive platform 126 may be secured to the floor 32c or near the floor by moving the drive platform 126 to align the drive platform flange holes with the base flange holes and inserting a retention member 136 through each set of aligned holes. Thus, for example, a retention member 136 is inserted through a hole in a first base flange 134 on a first side of an associated drive platform flange 128, then through the hole in the drive platform flange 128, then through the hole in the second base flange 134 on the second side of the drive platform flange 128 opposite the first side.

In one or more arrangements, each of the drive wheel retention members 136 is in the form of a pyrotechnic fastener operable to be breakable so as to deactivate the drive wheel retention mechanism to permit movement of the drive platform 126 and the drive wheels 40b coupled thereto. The pyrotechnic fasteners 136 may be structured to break responsive to receipt of an electric current or other signal from processor(s) 50 or another signal source, thereby deactivating the drive wheel retention mechanism. The pyrotechnic fasteners 136 may be hard-wired via system bus to a suitable activation signal source via system bus 33.

A drive wheel repositioning mechanism 140 may be operably coupled to the drive wheels 40b and may be structured to move the drive wheels 40b to second positions of the drive wheels (shown in FIG. 7) in which the drive wheels 40b are spaced apart from the base first surface 32s, upon deactivation of the drive wheel retention mechanism. In one or more arrangements, the drive wheel repositioning mechanism may be in the form of one or more spring members 140a, 140b structured to couple the drive platform 126 to the cover 38 or to another suitable portion of the mobile platform 30 which is not movable with respect to base 32. Spring members 140a, 140b are structured to be stretchable in a direction RR1 (FIGS. 6, 7) from the cover 38 toward the base floor 32c to exert a force tending to bias the drive platform 126 in the opposite direction RR2. Movement of the drive platform 126 so as to align the drive platform flange holes with the base flange holes as previously described will resiliently stretch and tension the spring members 140a, 140b so that in the absence of the retention members 136, the spring members 140a, 140b will tend to pull the drive platform 126 away from the base floor 32c.

Figure 5:
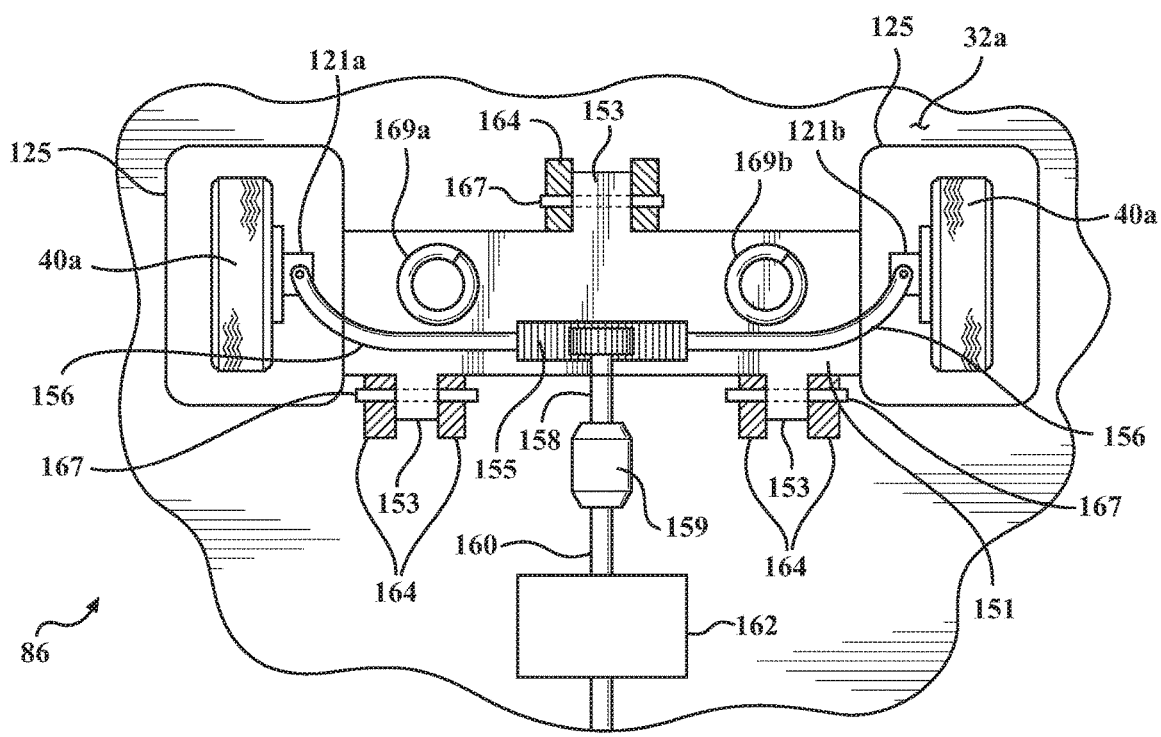
FIG. 5 is a schematic plan cross-sectional view another portion of the mobile platform of FIGS. 1 and 2, showing elements of a propulsion system of the test platform.

FIG. 5 is a schematic plan cross-sectional view a portion of the mobile platform 30 of FIGS. 1 and 2, showing elements of a steering system 86 of the test platform. The steering system 86 may include steerable wheels 40a and any system, mechanisms or actuators suitable for implementing steering commands from the autonomous control module 53 to steer the mobile platform 30. The mobile platform 30 may include at least one steerable wheel coupled to the base so as to movable with respect to the base first surface 32s. In the embodiment shown, the two wheels 40a are steerable wheels operably coupled to (or incorporated into) the steering system 86 of the mobile platform, structured to guide a direction of the mobile platform 30 along the ground surface G1. The wheels 40a may extend to the exterior of base 32a through wheel openings 125 formed in the base 32a. Although the embodiment shown includes a pair of steerable wheels 40a, a single steerable wheel or more than two steerable wheels may be used, depending on a given design.

In the embodiment shown, to enable the steerable wheels 40a to be movable with respect to base 32a, the wheels 40a may be mounted via conventional rotatable wheel mounts 121a, 121b to a steering platform 151 structured to be movable with respect to base 32a. The steering platform 151 may be a plate formed from a steel or another suitable material. The steering platform 151 may have flanges 153 extending from one or more edges thereof. Flanges 153 may have through holes formed therein. In embodiments described herein, the steering platform 151 may be movable independently of the drive platform 126.

As seen in FIGS. 5 and 6, a rack 155 of the steering system 86 may also be fixedly mounted to the steering platform 151. Linkages 156 may operatively couple the rack 155 to the steerable wheels 40a for steering the wheels in a known manner. A pinion 158 may be connected at one end to rack 155 and at an opposite end to a CV joint 159 or other type of joint or coupling structured to enable rotational motion of a steering shaft 160 to be transmitted to the pinion 158, while also maintaining contact between the steering shaft 160 and the pinion 158 as the rack 155 moves along with the steering platform 151 on which it is mounted. Thus, when the steering platform 151 is mounted on the base floor 32c, the steering shaft 160 may be rotated to effect steering commands to the wheels 40a. The rotation of the steering shaft 160 is transmitted to the pinion 158 via CV joint 159, and the rotation of the pinion 158 moves the rack 155 to steer the wheels 40a in a known manner. When the steering platform 151 is raised, the CV joint 159 provides a flexible connection enabling contact to be maintained between the pinion 158 and the rack 155. Steering shaft 160 may be coupled to a steering motor 162 or other mechanism structured to receive steering control commands and to translate the commands to a rotation of the steering 160 shaft which is transmitted to the pinion 158 and rack 155 to steer the wheels 40a. The steering motor 162 may be mounted to the base floor 32c.

As seen in FIG. 6, when the steering platform 151 is secured on or near the base floor 32c, the steerable wheels 40a are retained in first positions of the steerable wheels in which the wheels 40a extend through the wheel openings 125 and past the base first surface 32s along a first side S1 of the first surface 32s to contact ground surface G1. To retain the steerable wheels 40a in positions to contact the ground surface G1, steering platform 151 may be secured to the floor 32c or near the floor by a steerable wheel retention mechanism. In one or more arrangements of the steerable wheel retention mechanism, base flanges 164 may extend from floor 32c in positions structured to bracket each steering platform flange 153 on opposite sides thereof when the steering platform 151 is positioned on or near the base floor 32c. Each base flange 164 may have a through hole formed therein. The base flange through-holes are structured to be coaxially aligniable with the steering platform flange through holes when the steering platform 151 is positioned on or near the floor 32c.

In one or more arrangements, the steering platform 151 may be secured to the floor 32c or near the floor by moving the steering platform 151 to align the steering platform flange holes with the base flange holes and inserting a retention member through each set of aligned holes. Thus, for example, a retention member 167 is inserted through a hole in a first base flange 164 on a first side of an associated steering platform flange 153, then through the hole in the steering platform flange 153, then through the hole in the second base flange 164 on the second side of the steering platform flange 153, opposite the first side.

In one or more arrangements, each of the retention members 167 is in the form of a pyrotechnic fastener operable to break the pyrotechnic fastener so as to deactivate the steerable wheel retention mechanism to permit movement of the steering platform 151 and the steerable wheels 40a coupled thereto. The pyrotechnic fasteners 167 may be structured to break responsive to receipt of an electric current or other signal from processor(s) 50 or another signal source, thereby deactivating the steerable wheel retention mechanism. The pyrotechnic fasteners 167 may be hard-wired via system bus 33 to a suitable activation signal source.

A steerable wheel repositioning mechanism may be operably coupled to the steerable wheels 40a and may be structured to move the steerable wheels 40a to second positions of the steerable wheels (shown in FIG. 7) in which the steerable wheels 40a are spaced apart from the ground surface G1 upon deactivation of the steerable wheel retention mechanism. In one or more arrangements, the steerable wheel repositioning mechanism may be in the form of one or more spring members 169a, 169b structured to couple the steering platform to the cover 38 or to another suitable portion of the mobile platform 30 which is not movable with respect to the base 32a.

Spring members 169a, 169b are structured to be stretchable in direction RR1 from the cover toward the base floor to exert a force tending to bias the steering platform 151 in the direction RR2. Movement of the steering platform 151 so as to align the steering platform flange holes with the base flange holes as previously described will resiliently stretch and tension the spring members 169a, 169b so that in the absence of the retention members 157, the spring members will tend to pull the steering platform 151 away from the base 32a.

Figure 7:
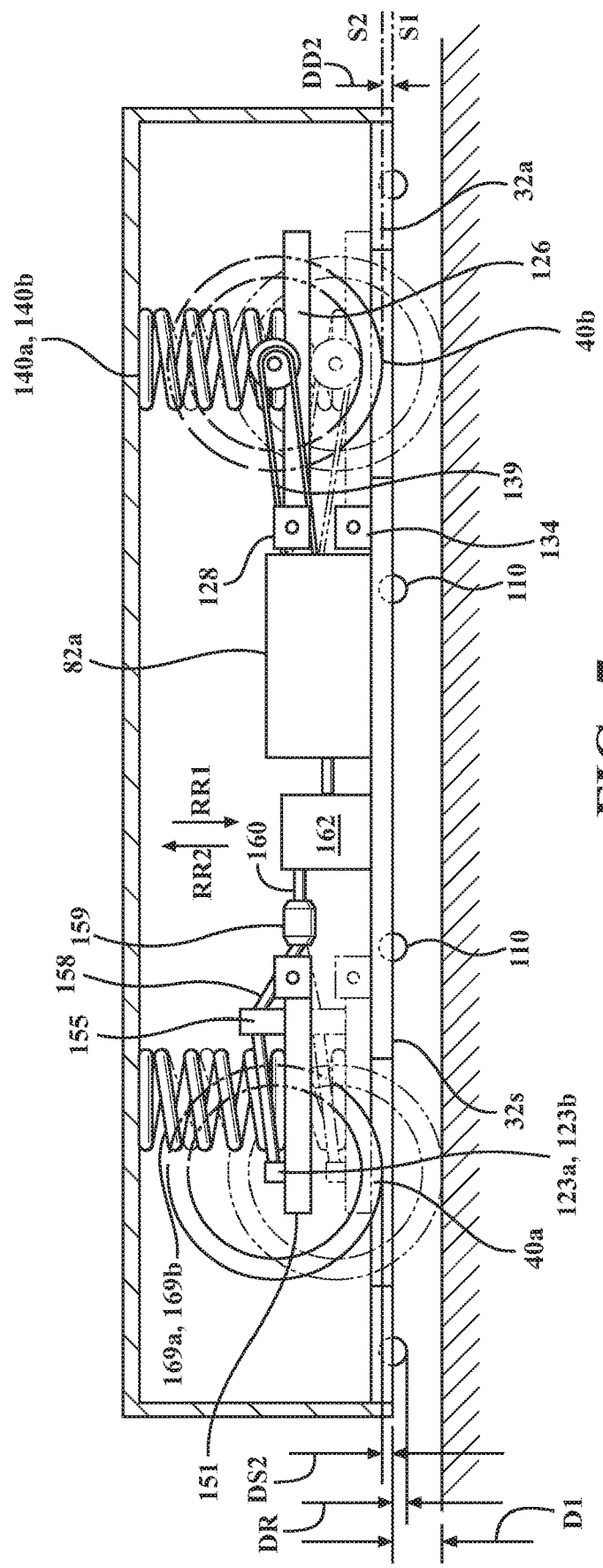
FIG. 7 is the schematic cross-sectional side view of FIG. 6, showing elements of the propulsion system and the steering system in a configuration where the guided platform wheels are spaced apart from the ground surface so as to permit roller elements of the mobile platform to contact the ground surface and support the platform.

Referring to FIGS. 6 and 7, in the following description, DS1 is a distance the steerable wheels 40a extend from base first surface 32s when the steerable wheels 40a are in the first positions with respect to base 32, in which the steerable wheels are in contact with the ground surface G1. DS2 is a second distance the steerable wheels 40a extend from base first surface 32s when the steerable wheels 40a are in the second positions with respect to base 32, in which the steerable wheels are spaced apart from the ground surface G1. DD1 is a first distance the drive wheels 40b extend from base first surface 32s when the drive wheels 40b are in the first positions with respect to base 32, in which the drive wheels are in contact with the ground surface G1. DD2 is a second distance the drive wheels 40b extend from base first surface 32s when the drive wheels 40b are in the second position with respect to base 32, in which the drive wheels are spaced apart from the ground surface G1. DR is a distance the roller elements extend from base first surface 32s.

Referring to FIG. 6, as stated previously, a plurality of roller elements 110 may be mounted along the base first surface 32s as shown. Each of roller elements 110 is structured to extend to a distance DR from the first surface along the first side of the first surface. Roller elements 110 may be structured to enable the mobile platform 30 to move in any direction along the ground surface G1 when the roller elements 110 are in contact with the ground surface.

As seen in FIG. 6, when the drive platform 126 is secured on or near the base floor 32c, the drive wheels 40b are retained in first positions of the drive wheels in which the wheels 40b extend to a first distance DD1 from the base first surface 32s along a first side S1 of the base first surface 32s. When the drive wheels 40b extend the first distance DD1 from the base first surface 32s, the drive wheels extend through the wheel openings 127 and past the roller elements 110 to make contact with the ground surface G1. Similarly, when the steering platform 151 is secured on or near the base floor 32c, the steerable wheels 40a are retained in first positions of the steerable wheels in which the wheels 40a extend to first distances DS1 from the base first surface 32s along a first side S1 of the base first surface 32s. When the steerable wheels 40*a* extend the first distances DS1 from the base first surface 32*s*, the steerable wheels extend through the wheel openings 125 and past the roller elements 110 to make contact with the ground surface G1.

All of the steerable wheels 40*a* may be designed to extend the same distance from surface 32*s* when the steerable wheels 40*a* are in their respective first positions, in contact with ground surface G1. Also, all of the drive wheels 40*b* may be designed to extend the same distance from surface 32*s* when the drive wheels 40*b* are in their respective first positions, in contact with ground surface G1. Also, all of the roller elements 110 may be designed to extend the same distance from surface 32*s* along the first side S1 of the base. However, the actual distances that individual drive wheels 40*b*, steerable wheels 40*a*, and roller elements 110 extend from the base first surface 32*s* under the various conditions described herein may vary to a slight degree within associated ranges of values, due to manufacturing tolerances, slightly different suspension heights of front and rear portions (and/or left and right side portions) of the mobile platform, slight differences in wheel and roller diameters, and other factors. Thus, for example, a first one of steerable wheels 40*a* may extend a first distance DS1(1) from the base first surface 32*s* while a second one of steerable wheels 40*a* may extend a slightly different first distance DS1(2) from the base first surface 32*s* when the steerable wheels 40*a* are secured in their respective first positions and in contact with ground surface G1. Thus, for purposes described herein, the first distance DS1 that the steerable wheels 40*a* extend from the base first surface 32*s* and the distance DR that the roller elements 110 extend from the base first surface 32*s* may be specified in relation to each other to always satisfy the relationship DS1>DR, such that the smallest value of DS1 that any of the steerable wheels 40*a* extend from the base first surface 32*s* when the steerable wheels 40*a* are in first positions of the steerable wheels is always larger than the largest value of DR that any of the roller elements 110 may extend from the base first surface 32*s*. Also, in embodiments described herein, the first distance DD1 that the drive wheels 40*b* extend from the base first surface 32*s* and the distance DR that the roller elements 110 extend from the base first surface 32*s* may be specified in relation to each other to always satisfy the relationship DD1>DR, such that the smallest value of DD1 that any of the drive wheels 40*b* extend from the base first surface 32*s* when the drive wheels 40*b* are in first positions of the drive wheels is always larger than the largest distance DR that any of the roller elements 110 may extend from the base first surface 32*s*. Satisfaction of the above-described relationships ensures that the mobile platform 30 will be supported on the ground surface G1 by only the steerable wheels 40*a* and the drive wheels 40*b*, and not by the roller elements 110, when the steerable wheels 40*a* and the drive wheels 40*b* are secured in their respective first positions as described herein.

Also, the second distance DD2 that the drive wheels 40*b* extend from the base first surface 32*s* in second positions of the drive wheels may be specified such that, when the second distance DD2 extends to a first side S1 (FIG. 6) of the base first surface 32*s*, the relationship DR>DD2 is always satisfied, such that the largest second distance DD2 that any drive wheel 40*b* extends from the base first surface 32*s* will be smaller than the smallest distance DR that any of the roller elements 110 extend from the base first surface 32*s* when the roller elements are in contact with the ground surface G1 and supporting the mobile platform 30. Furthermore, the second distance DS2 that the steerable wheels 40*a* extend from the base first surface 32*s* in second positions of the steerable wheels may be specified such that, when the second distance DS2 extends to the first side S1 of the base first surface 32*s*, the relationship DR>DS2 is always satisfied, such that the largest second distance DS2 that any steerable wheel 40*a* extends from the base first surface 32*s* will be smaller than the smallest distance DR that any of the roller elements 110 extend from the base first surface 32*s* when the roller elements are in contact with the ground surface G1 and supporting the mobile platform 30. Satisfaction of these relationships ensures that the mobile platform 30 will be supported on the ground surface G1 by only the roller elements 110, and not by the steerable wheels 40*a* and the drive wheels 40*b*, when the steerable wheels 40*a* and the drive wheels 40*b* are secured in their respective second positions as described herein. Thus, each of the distances DD1, DD2, DS1, DS2, and DR may encompass a range of values which satisfy the above-mentioned relationships.

Operation of the drive wheel repositioning mechanism and the steerable wheel repositioning mechanism will now be discussed with reference to FIGS. 4-7. When it is desired to raise drive wheels 40*b* to positions spaced apart from the ground surface G1, an electric current or other control signal may be transmitted to the pyrotechnic fasteners 136 retaining the drive platform 126 in the position shown in FIG. 6, in which the drive wheels 40*b* extend to the first distance DD1 from the surface 32*s* and are positioned in contact with the ground surface G1, with the roller elements 110 spaced apart from the ground surface. The control signal may cause the pyrotechnic fasteners 136 to break, thereby releasing the drive platform 126 and allowing the tensioned spring members 140*a*, 140*b* to pull the drive platform 126 toward the cover 38, to a position shown in FIG. 7 in which the drive wheels 40*b* extend to the second distance DD2 of the drive wheels 40*b* from the base first surface 32*s*.

Similarly, to raise the steerable wheels 40*a* to positions spaced apart from the ground surface G1, the same control signal may be transmitted to the pyrotechnic fasteners 167 retaining the steering platform 151 in the position shown in FIG. 6, wherein the steerable wheels 40*a* extend to the first distance DS1 from surface 32*s* and are in contact with ground surface G1. The control signal may cause the pyrotechnic fasteners 167 to break, thereby releasing the steering platform 151 and allowing the tensioned spring members 169*a*, 169*b* to pull the steering platform 151 toward the cover 38, to a position shown in FIG. 7 in which the steerable wheels 40*a* extend to the second distance DS2 of the steerable wheels 40*a* from the base first surface 32*s*.

The second distance DS2 of the steerable wheels 40*a* from the base first surface 32*s* may be different from the second distance DD2 of the drive wheels 40*b* from the base first surface 32*s*, depending on such factors as the weights of the drive and steering platforms and the elements attached to them, the spring member characteristics, and other pertinent factors. When the drive wheels 40*b* extend to the second distance DD2 of the drive wheels from the base first surface 32*s*, the drive wheels 40*b* are out of contact with the ground surface G1. Also, when the steerable wheels 40*a* extend to the second distance DS2 of the steerable wheels 40*a* from the base first surface 32*s*, the steerable wheels 40*a* are out of contact with the ground surface G1.

As seen in FIG. 7, as the drive wheels 40*b* and steerable wheels 40*a* are pulled toward the cover 38, the base first surface 32*s* and the roller elements 110 move closer and closer to the ground surface G1, eventually contacting the ground surface G1 as the drive wheels 40*b* and steerable wheels 40*a* continue to move toward the cover 38, until the roller elements 110 are closer to the ground surface than the drive wheels 40*b*. When the drive wheels 40*b* and the steerable wheels 40*a* have been fully repositioned as shown in FIG. 7, the roller elements 110 alone may support the mobile platform 30 on the ground surface G1 instead of the drive wheels 40*b* and steerable wheels 40*a*.

In one or more arrangements, as shown in FIG. 7, the drive wheels 40*b* may be moved to locations where the second distance DD2 of the drive wheels 40*b* from the base first surface 32*s* is a distance from the base first surface 32*s* along a second side S2 of the base first surface 32*s* opposite the first side S1. In other arrangements, the drive wheels 40*b* may be moved to locations where the second distance DD2 of the drive wheels 40*b* from the base first surface 32*s* may be less than the distance DR the roller elements 110 extend from the base first surface 32*s* and may be along the first side S1 of the base first surface 32*s*. Similarly, in one or more arrangements, as shown in FIG. 7, the steerable wheels 40*a* may be moved to locations where the second distance DS2 of the steerable wheels 40*a* from the base first surface 32*s* is a distance from the base first surface along the second side S2 of the base first surface 32*s* opposite the first side S1. In other arrangements, the steerable wheels 40*a* may be moved to locations where the second distance DS2 of the steerable wheels 40*a* from the base first surface 32*s* may be less than the distance DR that the roller elements 110 extend from the base first surface 32*s* and may be along the first side S1 of the base first surface 32*s*. In either case, in the second locations of the drive wheels 40*b* and steerable wheels 40*a*, these wheels are spaced farther apart from the ground surface G1 than the roller elements 110. Thus, only the roller elements 110 (and not the drive wheels and steerable wheels) support the mobile platform 30 on the ground surface G1. This permits the mobile platform 30 to move readily in any direction along the ground surface G1 responsive to contact of the platform 30 by a subject vehicle. The bumpers 100*a*-100*d* may further aid in protecting the mobile platform 30 against damage.

Retraction of the drive and steerable wheels prior to impact by the subject vehicle may aid in preventing damage to the mobile platform 30 and to the subject vehicle by minimizing collision resistance forces applied by the mobile platform to the subject vehicle, and by enabling the mobile platform to quickly move away from the subject vehicle responsive to contact.

In embodiments described herein, repositioning of the drive wheels 40*b* and the steerable wheels 40*a* may be performed in response to a determination that one of multiple possible collision conditions has occurred. The autonomous control module 53 may include instructions that when executed by the processors cause the processors to deactivate the drive wheel retention mechanism to enable movement of the drive wheels 40*b* responsive to a determination that a collision condition has occurred. The autonomous control module 53 may further include instructions to deactivate the steerable wheel retention mechanism to enable movement of the steerable wheels 40*a* responsive to the determination that the collision condition has occurred.

In one operational mode, the collision condition may be a pending collision condition in which one of the mobile platform 30 and a subject vehicle is determined to be on a collision course with the other one of the mobile platform 30 and the subject vehicle. To implement in this operational mode, the autonomous control module 53 may include instructions to determine, using at least data from the one or more sensors 70, if either one of the mobile platform 30 and a subject vehicle is on a collision course with the other one of mobile platform 30 and the subject vehicle. For example, the autonomous control module 53 or other locations in memory 52 may include instructions that when executed by the processor(s) 50 cause the processor(s)s to determine if one or both of the mobile platform 30 and the subject vehicle are moving, and the direction(s) and speed(s) of movement. The autonomous control module 53 may further include instructions to, if one of the mobile platform 30 and the subject vehicle is determined to be on a collision course with the other one of the mobile platform 30 and the subject vehicle, estimate an amount of time until contact between the subject vehicle and the mobile platform.

The autonomous control module 53 may further include instructions to deactivate the drive wheel retention mechanism so as to enable movement of the drive wheels 40*b* to positions spaced apart from the ground surface G1 at least a predetermined amount of time prior to expiration of the estimated amount of time until contact between the subject vehicle and the mobile platform 30. The autonomous control module may further include instructions to deactivate the steerable wheel retention mechanism so as to enable movement of the steerable wheels 40*a* to positions spaced apart from the ground surface G1 at least a predetermined amount of time prior to expiration of the estimated amount of time until contact between the subject vehicle and the mobile platform 30. In one or more arrangements described herein, the drive wheel retention mechanism and/or the steerable wheel retention mechanism may be deactivated responsive to a wireless control signal.

In another operational mode, the collision condition is an actual collision condition in which actual physical contact between a subject vehicle and the mobile platform is determined to have occurred. The actual physical contact may be detected by collision or impact sensors of the mobile platform sensors 71. To implement this operational mode the autonomous control module 53 may further include instructions to determine, using at least data from the one or more sensors 70, if physical contact between the subject vehicle and the mobile platform 30 has occurred. The autonomous control module 53 may further include instructions to, responsive to a determination that physical contact between the mobile platform 30 and the subject vehicle has occurred, deactivate the drive wheel retention mechanism so as to enable movement of the drive wheels 40*b* to positions spaced apart from the ground surface G1. The autonomous control module 53 may further include instructions to, responsive to the determination that an actual collision condition has occurred, deactivate the steerable wheel retention mechanism so as to enable movement of the steerable wheels 40*a* to positions spaced apart from the ground surface G1.

Figure 8:
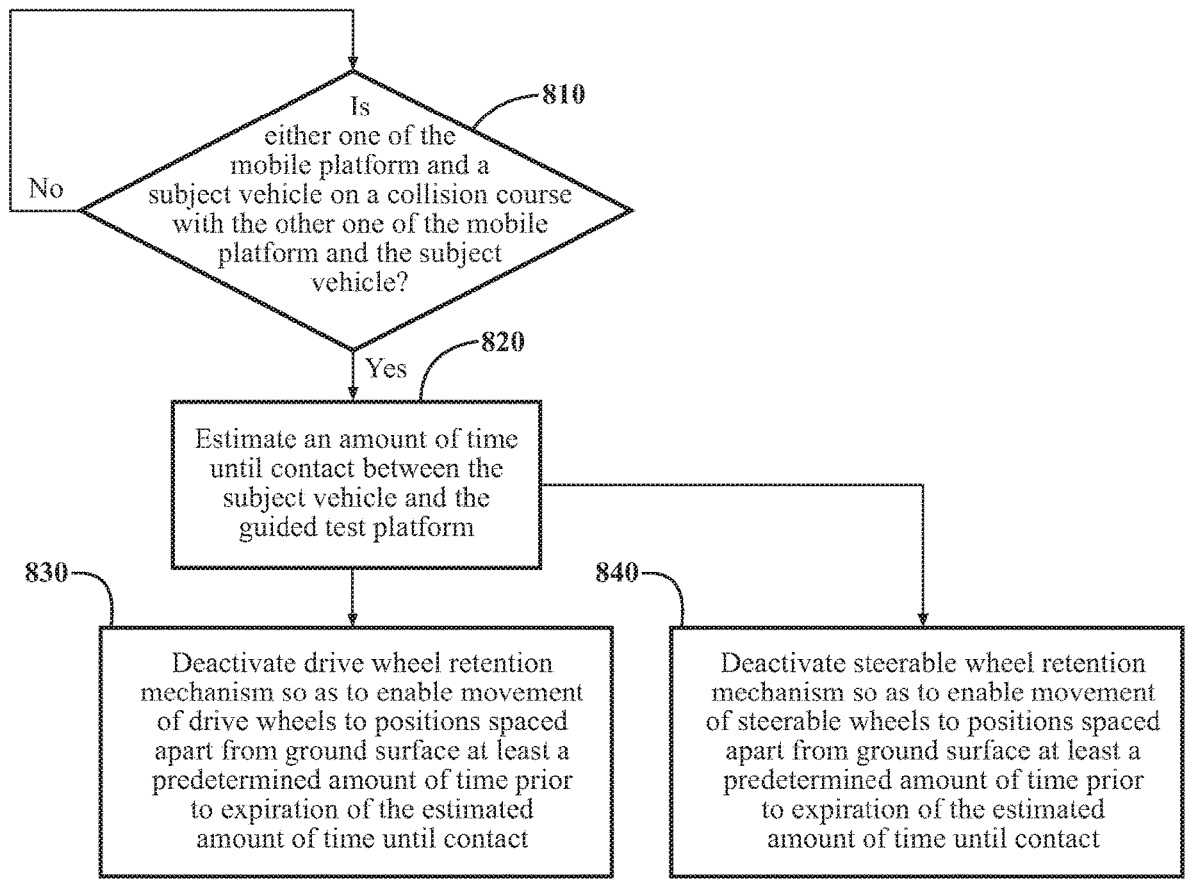
FIG. 8 is a flow diagram illustrating operation of an embodiment of the mobile platform to permit roller elements of the mobile platform to contact the ground surface and support the platform, upon detection of a subject vehicle on a collision course with the platform.

FIG. 8 is a flow diagram illustrating operation of the mobile platform for a pending collision condition. The mobile platform sensor system 70 may continuously scan an environment of the mobile platform, to detect vehicles and/or obstacles. In block 810, the processor(s) 50 may determine, using at least data from the sensors 70, if either one of the mobile platform 30 and a subject vehicle is on a collision course with the other one of the mobile platform 30 and the subject vehicle. If one of the mobile platform 30 and the subject vehicle is determined not to be on a collision course with the other one of the mobile platform 30 and the subject vehicle, the sensors 70 may continue scanning. If one of the mobile platform 30 and the subject vehicle is determined to be on a collision course with the other one of the mobile platform 30 and the subject vehicle, the processor(s) 50 may (in block 820) estimate an amount of time until contact between the subject vehicle and the mobile platform 30. The processor(s) 50 may then (in block 830) generate a signal causing deactivation of the drive wheel retention mechanism so as to enable movement of the drive wheels 40b to positions spaced apart from the ground surface G1 at least a predetermined amount of time prior to expiration of the estimated amount of time until contact between the subject vehicle and the mobile platform 30. Simultaneously with the signal causing deactivation drive wheel retention mechanism, the processor(s) 50 may (in block 840) generate a signal causing deactivation of the steerable wheel retention mechanism so as to enable movement of the steerable wheels 40a to positions spaced apart from the ground surface G1 at least a predetermined amount of time prior to expiration of the estimated amount of time until contact between the subject vehicle and the mobile platform 30.

Figure 9:
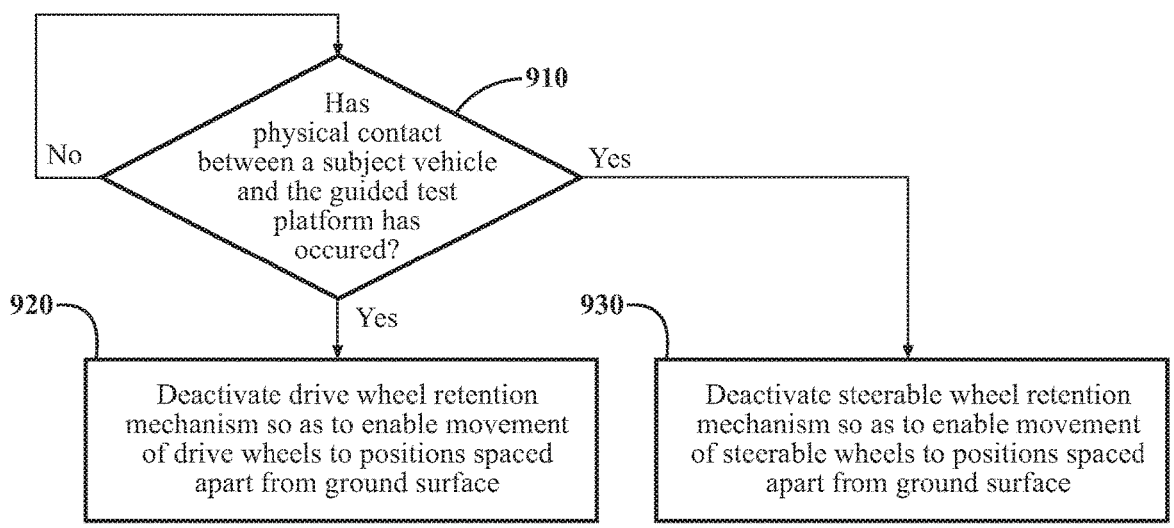
FIG. 9 is a flow diagram illustrating operation of an embodiment of the mobile platform to permit roller elements of the mobile platform to contact the ground surface and support the platform, responsive to a collision or contact between a subject vehicle and the mobile platform.

FIG. 9 is a flow diagram illustrating operation of the mobile platform for an actual collision condition. The mobile platform sensor system 70 may (in block 910) continuously scan to detect any contact between the mobile platform and any subject vehicle. If there has been actual physical contact between a subject vehicle and the mobile platform, the processor(s) 50 may (in block 920) generate a signal causing deactivation the drive wheel retention mechanism so as to enable movement of drive wheels 40b to positions spaced apart from the ground surface G1. Simultaneously with the signal causing deactivation drive wheel retention mechanism, the processor(s) 50 may (in block 930) generate a signal causing deactivation steerable wheel retention mechanism so as to enable movement of the steerable wheels 40a to positions spaced apart from the ground surface G1. Thus, in the operational mode for the actual collision condition, the drive and steerable wheels are not retracted and the mobile platform is not supported by the roller elements until after an actual collision has occurred.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods and/or operations described herein is suited. A typical combination of hardware and software can be a processing system with computer-usable program code that, when being loaded and executed, controls the processing system such that it carries out the methods and/or operations described herein. The systems, components and/or processes also can be embedded in a computer-readable storage, such as a computer program product or other data programs storage device, readable by a machine, tangibly embodying a program of instructions executable by the machine to perform methods and/or operations described herein. These elements also can be embedded in an application product which comprises all the features enabling the implementation of the methods described herein and, which when loaded in a processing system, is able to carry out these methods.

Furthermore, arrangements and/or operations described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A mobile platform comprising:
a base having a first surface;
at least one drive wheel coupled to the base so as to be movable with respect to the base first surface;
a drive wheel retention mechanism coupled to the at least one drive wheel, the drive wheel retention mechanism being structured to retain the at least one drive wheel in a first position in which the at least one drive wheel extends to a first distance of the at least one drive wheel from the first surface along a first side of the first surface, the drive wheel retention mechanism being deactivable to enable movement of the at least one drive wheel with respect to the base first surface, the drive wheel retention mechanism including at least one pyrotechnic fastener coupled to the at least one drive wheel and to the base, the at least one pyrotechnic fastener being operable to break the at least one pyrotechnic fastener so as to deactivate the drive wheel retention mechanism to permit movement of the at least one drive wheel; and a plurality of roller elements coupled to the base, the plurality of roller elements being structured to extend to a distance of the plurality of roller elements from the first surface along the first side of the first surface, wherein the distance of the plurality of roller elements from the first surface is less than the first distance of the at least one drive wheel from the base first surface.

2. The mobile platform of claim 1, wherein the mobile platform further comprises a drive wheel repositioning mechanism coupled to the at least one drive wheel and structured to move the at least one drive wheel to a second position of the at least one drive wheel in which the at least one drive wheel extends to a second distance of the at least one drive wheel from the base first surface upon deactivation of the drive wheel retention mechanism.

3. The mobile platform of claim 2 wherein the drive wheel repositioning mechanism comprises at least one spring member coupling the at least one drive wheel to a portion of the mobile platform which is not movable with respect to the base.

4. The mobile platform of claim 2 wherein the second distance of the at least one drive wheel from the first surface is less than the distance of the plurality of roller elements from the base first surface and is along the first side of the base first surface.

5. The mobile platform of claim 2 wherein the second distance of the at least one drive wheel from the first surface is a distance from the base first surface along a second side of the base first surface opposite the first side.

6. A mobile platform comprising:
a base having a first surface;
at least one drive wheel coupled to the base so as to be movable with respect to the base first surface;
a drive wheel retention mechanism coupled to the at least one drive wheel, the drive wheel retention mechanism being structured to retain the at least one drive wheel in a first position of the at least one drive wheel in which the at least one drive wheel extends to a first distance of the at least one drive wheel from the first surface along a first side of the first surface;
a plurality of roller elements coupled to the base, the plurality of roller elements being structured to extend to a distance of the plurality of roller elements from the first surface along the first side of the first surface, wherein the distance of the plurality of roller elements from the first surface is less than the first distance of the at least one drive wheel from the base first surface;
at least one steerable wheel coupled to the base so as to be movable with respect to the base first surface; and
a steerable wheel retention mechanism coupled to the at least one steerable wheel and to the base, the steerable wheel retention mechanism being structured to retain the at least one steerable wheel in a first position of the at least one steerable wheel in which the at least one steerable wheel extends to a first distance of the at least one steerable wheel from the base first surface along the first side of the base first surface, wherein the distance of the plurality of roller elements from the first surface is less than the first distance of the at least one steerable wheel from the base first surface, wherein the at least one steerable wheel is structured to be movable independently of the at least one drive wheel.

7. The mobile platform of claim 6 further comprising a steerable wheel repositioning mechanism coupled to the at least one steerable wheel and structured to move the at least one steerable wheel to a second position of the at least one steerable wheel in which the at least one steerable wheel extends to a second distance of the at least one steerable wheel from the base first surface, upon deactivation of the steerable wheel retention mechanism.

8. The mobile platform of claim 7 wherein the second distance of the at least one steerable wheel from the base first surface is different from the second distance of the at least one drive wheel from the base first surface.

9. The mobile platform of claim 7 wherein the second distance of the at least one steerable wheel from the base first surface is less than the distance of the plurality of roller elements from the base first surface and along the first side of the base first surface.

10. The mobile platform of claim 7 wherein the second distance of the at least one steerable wheel from the base first surface is a distance from the base first surface along a second side of the base first surface opposite the first side.

11. The mobile platform of claim 7 wherein the steerable wheel retention mechanism comprises at least one pyrotechnic fastener coupled to the at least one steerable wheel and to the base, the at least one pyrotechnic fastener being operable to break the at least one pyrotechnic fastener so as to deactivate the steerable wheel retention mechanism to permit movement of the at least one steerable wheel.

12. A mobile platform comprising:
a base;
at least one drive wheel coupled to the base so as to be movable with respect to the base;
a drive wheel retention mechanism coupled to the at least one drive wheel and to the base, the drive wheel retention mechanism being structured to retain the at least one drive wheel in a first position of the at least one drive wheel in which the at least one drive wheel is in contact with a ground surface, the drive wheel retention mechanism being deactivable to enable movement of the at least one drive wheel from the first position of the at least one drive wheel;
at least one steerable wheel coupled to the base so as to movable with respect to the base;
a steerable wheel retention mechanism coupled to the at least one steerable wheel and to the base, the steerable wheel retention mechanism being structured to retain the at least one steerable wheel in a first position of the at least one steerable wheel in which the at least one steerable wheel is in contact with the ground surface, the steerable wheel retention mechanism being deactivable to enable movement of the at least one steerable wheel from the first position of the at least one steerable wheel;
one or more sensors including sensors configured to detect position and motion parameters of a subject vehicle in an external environment of the mobile platform and sensors configured to detect position and motion parameters of the mobile platform;
one or more processors communicably coupled to the one or more sensors; and
a memory communicably coupled to the one or more processors and storing an autonomous control module including instructions that when executed by the one or more processors cause the one or more processors to deactivate the drive wheel retention mechanism to enable movement of the at least one drive wheel and deactivate the steerable wheel retention mechanism to enable movement of the at least one steerable wheel responsive to a determination that a collision condition has occurred.

13. The mobile platform of claim 12 wherein the collision condition is a pending collision condition in which one of the mobile platform and a subject vehicle is determined to be on a collision course with the other one of the mobile platform and the subject vehicle, and wherein the autonomous control module further includes instructions to:
  determine, using at least data from the one or more sensors, if either one of the mobile platform and a subject vehicle is on a collision course with the other one of the mobile platform and a subject vehicle;
  if one of the mobile platform and the subject vehicle is determined to be on a collision course with the other one of the mobile platform and the subject vehicle, estimate an amount of time until contact between the subject vehicle and the mobile platform; and
  deactivate the drive wheel retention mechanism so as to enable movement of the at least one drive wheel to a position spaced apart from the ground surface at least a predetermined amount of time prior to expiration of the estimated amount of time until contact between the subject vehicle and the mobile platform.

14. The mobile platform of claim 12 wherein the collision condition is an actual collision condition in which physical contact between the mobile platform and the subject vehicle is determined to have occurred, and wherein the autonomous control module further includes instructions to:
  determine, using at least data from the one or more sensors, that physical contact between the mobile platform and the subject vehicle has occurred; and
  responsive to a determination that physical contact between the mobile platform and the subject vehicle has occurred, deactivate the drive wheel retention mechanism so as to enable movement of the at least one drive wheel to a position spaced apart from the ground surface.

* * * * *